United States Patent
Bauer et al.

(10) Patent No.: US 11,319,188 B2
(45) Date of Patent: May 3, 2022

(54) DRIVE ARRANGEMENT COMPRISING A MOVEABLE RAIL SEGMENT

(71) Applicant: TK Elevator Innovation and Operations GmbH, Düsseldorf (DE)

(72) Inventors: Daniel Bauer, Durlangen (DE); Matthias Glück, Hochdorf (DE); Martin Madera, Neuhausen (DE)

(73) Assignee: TK Elevator innovation and Operations GmbH, Duesseldorf (DE)

( * ) Notice: Subject to any disclaimer, the term of this patent is extended or adjusted under 35 U.S.C. 154(b) by 0 days.

(21) Appl. No.: 16/490,839

(22) PCT Filed: Mar. 5, 2018

(86) PCT No.: PCT/EP2018/055332
§ 371 (c)(1),
(2) Date: Sep. 3, 2019

(87) PCT Pub. No.: WO2018/162405
PCT Pub. Date: Sep. 13, 2018

(65) Prior Publication Data
US 2020/0002131 A1  Jan. 2, 2020

(30) Foreign Application Priority Data
Mar. 6, 2017 (DE) .................... 10 2017 203 599.4

(51) Int. Cl.
*B66B 1/06* (2006.01)
*B66B 7/02* (2006.01)
(Continued)

(52) U.S. Cl.
CPC ............ *B66B 7/023* (2013.01); *B66B 1/3461* (2013.01); *G05B 9/03* (2013.01); *B66B 9/003* (2013.01); *B66B 11/0407* (2013.01)

(58) Field of Classification Search
USPC ........................................................ 187/391
See application file for complete search history.

(56) References Cited

U.S. PATENT DOCUMENTS 4,830,141 A * 5/1989 Montaigne ............... A62B 1/04
  182/141
5,650,885 A * 7/1997 Kitamura ............... G11B 19/28
  360/73.02
(Continued)

FOREIGN PATENT DOCUMENTS

CN  1338817 A   3/2002
CN  106163963 A  11/2016
(Continued)

OTHER PUBLICATIONS

English Translation of International Search Report issued in PCT/EP2018/055332, dated Jul. 16, 2018.

*Primary Examiner* — Christopher Uhlir
(74) *Attorney, Agent, or Firm* — William J. Cassin

(57) ABSTRACT

A drive arrangement includes a movable, rotatable rail segment of an elevator system. An electric motor moves the movable rail segment. The drive arrangement is configured to rotate the rail segment about an angle of rotation of less than 360°. An inverter unit provides electrical power to the electric motor and is configured to receive a control command relating to the position of the movable rail segment and provide the electrical drive power based on the control command. The drive arrangement forms two or exactly three drive segments. Each drive segment includes an inverter unit and a coil arrangement, which is supplied with electrical power by the assigned inverter unit. Each inverter unit includes a communication unit, which receives the control command. The communication units are configured to (Continued)

specify amongst themselves a master communication unit and to specify the remaining communication unit as slave communication units.

10 Claims, 5 Drawing Sheets

(51) Int. Cl.
*B66B 1/34* (2006.01)
*G05B 9/03* (2006.01)
*B66B 9/00* (2006.01)
*B66B 11/04* (2006.01)

(56) References Cited

U.S. PATENT DOCUMENTS

| | | | |
|---|---|---|---|
| 9,054,553 B2* | 6/2015 | Colombi | ........... H02J 9/062 |
| 2002/0018823 A1 | 2/2002 | Ito | |
| 2014/0340013 A1 | 11/2014 | Li | |
| 2016/0276966 A1 | 9/2016 | Tian | |
| 2016/0357194 A1* | 12/2016 | Cheong | ........... H04L 67/125 |
| 2017/0107080 A1 | 4/2017 | Steinhauer | |
| 2019/0077635 A1* | 3/2019 | King | ........... B66B 9/003 |

FOREIGN PATENT DOCUMENTS

| | | |
|---|---|---|
| CN | 106208531 A | 12/2016 |
| CN | 106414298 A | 2/2017 |
| DE | 10 2015 218 025 A | 3/2017 |
| DE | 10 2016 211 997 A | 1/2018 |
| EP | 1 834 917 A | 9/2007 |
| WO | 2012/038760 A | 3/2012 |
| WO | 2015/144781 A | 10/2015 |
| WO | 2015/144784 A | 10/2015 |
| WO | 2015182446 A | 12/2015 |

\* cited by examiner

DRIVE ARRANGEMENT COMPRISING A MOVEABLE RAIL SEGMENT

CROSS REFERENCE TO RELATED APPLICATIONS

This application is a U.S. National Stage Entry of International Patent Application Serial Number PCT/EP2018/055332, filed Mar. 5, 2018, which claims priority to German Patent Application No. DE 10 2017 203 599.4, filed Mar. 6, 2017, the entire contents of both of which are incorporated herein by reference.

FIELD

The present disclosure generally relates to a drive arrangement comprising a movable rail segment in an elevator system.

BACKGROUND

The invention can be used in the case of elevator systems comprising at least one elevator car, in particular a plurality of elevator cars, which can be moved in a shaft via guide rails. At least one stationary first guide rail is fixedly arranged in a shaft and is aligned in a first, in particular vertical, direction; at least one stationary second guide rail is fixedly aligned in a second, in particular horizontal, direction; at least one third, in particular rotatable, guide rail, which can be moved relative to the shaft, is fastened to a rotating platform and can be transferred between a first or a second position and/or an alignment in the first direction and an alignment in the second direction. The elevator cars can travel circumferentially here like a paternoster.

Such systems are described, in substance, in WO 2015/144781 A1 and also in the German patent applications 10 2016 211 997.4 and 10 2015 218 025.5.

The essential advantage of such elevator systems lies in the significant capacity increase as compared to conventional systems, in which the elevator cars always move in the same shaft. A passenger transport capacity, for which five or more shafts would be required in a conventional system, can thus already be provided with two shafts with an above-mentioned elevator system.

This results in increased demands on reliability. In the case of a conventional elevator system comprising five shafts, the failure of one elevator shaft represents a reduction of the total passenger transport capacity by 20%. In the case of the above-mentioned elevator system, the failure of one elevator shaft may represent a reduction of the passenger transport capacity by 100%. Depending on position or rotational position, respectively, the movable rail segments thereby temporarily interrupt the vertical travel path in the elevator shaft. Should the drive of the movable rail segments fail in such a state, the entire elevator system may fail.

Thus a need exists for a highly reliable elevator system.

DETAILED DESCRIPTION

Figure 1:
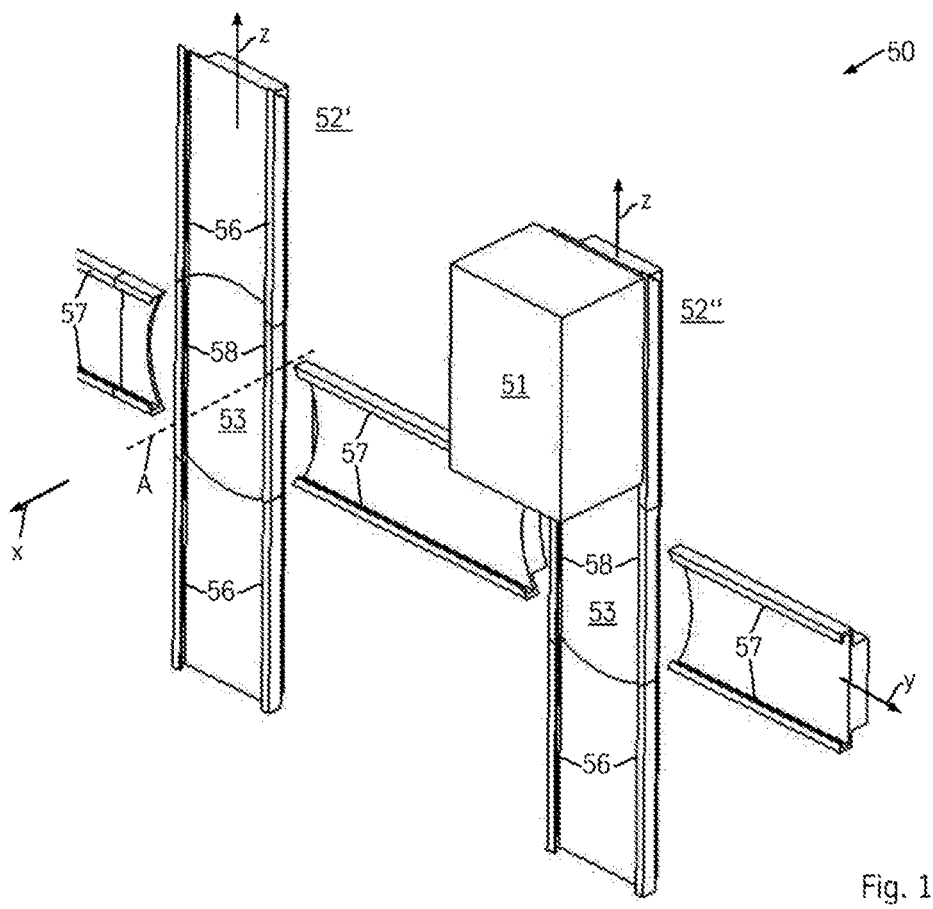
FIG. 1 is a sectional view of an elevator system, into which the drive arrangement is installed.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a drive arrangement comprising a movable rail segment in an elevator system and an electric motor for moving the movable rail segment.

The drive arrangement according to the invention comprises:

a movable, in particular rotatable, rail segment of an elevator system, in particular of an elevator system of the above-mentioned type, an electric motor for moving, in particular rotating, the movable, in particular rotatable, rail segment, wherein the drive arrangement is in particular configured to rotate the rail segment about an angle of rotation of less than 360°, at least one inverter unit for providing electrical power to the electric motor.

The inverter unit is configured to receive a control command relating to the position or rotational position, respectively, of the movable rail segment, and to provide the electrical drive power on the basis of said control command.

Such a control command relating to the position can take a variety of forms. The control command can in particular include a concrete default angle (e.g. "90°"), take one of two possible values only in a binary manner (e.g. "0" means horizontal position; "1" means vertical position) or include modification instructions ("0" means maintain current position; "1" means change position to the respective other value). It goes without saying that the control command can have additional contents. Needless to say, any other values are also possible, which are in particular suitable to define a concrete position. Positions between 0° and 90° are possible as well; in particular when the second direction is not aligned horizontally. Needless to say, the same applies for other positions, when the third rail is moved in a non-rotating manner.

The drive arrangement according to the invention forms at least two, in particular exactly three, drive segments, each drive segment comprises an inverter unit and at least one coil arrangement, which is supplied with electrical power by the assigned inverter unit. The coil arrangements apply a drive force in particular to a joint drive element, in particular the rotor, of the electric motor.

Each inverter unit comprises a communication unit, which is able (i.e. is embodied) to receive the control command. The communication units are configured so as to specify amongst themselves one communication unit from among the number of the communication units as a master communication unit and to specify the remaining communication units as slave communication units.

The advantage of the invention now lies in the redundant embodiment of the drive segments and in the ability that the redundant units of the drive arrangement organize independently. A decentralized decision structure, which does not require a central control unit, is used. The unit for allocating the master function is thus ultimately also present in a redundant manner. The reliability can thus be increased.

The electric motors for moving the movable rail segments differ significantly from drive engines for raising and lowering conventional elevator cars. The movement space, in particular the angle of rotation, is in particular limited; for example, a maximum angle of rotation of 90° is sufficient to transfer the movable rails from the vertical alignment into the horizontal alignment. In addition, the movable rail segments are connected by means of a plurality of electrical and electronic lines. In the case of a limited movement space, in particular angle of rotation, this can take place via a drag chain. In addition to the rotatable rail segment, the entire car is in particular also supported via the rotational bearing of the electric motor with an overhang.

The communication units are preferably configured in such a way that only the master communication unit is authorized to issue a receipt or execution confirmation regarding a control command relating to the position to the control unit. This has the advantage that the control unit only communicates with one communication unit. For the control unit, the plurality of the communication devices appears to be a single communication unit. This has advantages in the parameterization of the control unit, because the latter is independent of the number of the communication devices.

The master communication unit is preferably configured to receive a state value of the associated inverter unit and to send it to the slave communication units, which further preferably also takes place without interconnection of a central control unit for the above-mentioned reasons. The drive segments can thereby be synchronized with respect to individual state values.

The inverter unit, which is superordinate to the master communication unit, preferably comprises a controller. The state value to be sent is in particular a controller variable of the controller. Even though the coil units can thereby be operated via a joint controller, the controller is nevertheless present in a redundant manner and a different controller can take over at any time in the event of a failure of the currently active controller (master controller).

The inverter units preferably each comprise an inverter. The state value to be sent in particular represents a state variable of the inverter. The inverters are thereby synchronized directly with one another. Here, a controller also takes over control tasks and provides the control variable for an inverter. The inverter processes the control variable into one or a plurality of state variables, which are then provided to the slave inverters via the communication units.

Those inverter units, which are superordinate to a slave communication unit, then in particular use the state value provided by the master communication unit for the provision of the drive power, even though the slave inverter units are able to generate a corresponding state value on their own.

The communication units are preferably configured in such a way that the master communication unit prompts a reallocation of the master communication unit, as soon as the master communication unit determines an error within the corresponding drive segment. The current master communication unit then remains is excluded from a reallocation. The master communication unit monitors the ability of the master inverter unit to fulfill the master function. Should a negative result emerge, the reallocation is initiated. The "old" master communication unit can then not be selected again, since the master function is to be issued expressly.

Insofar as the plural form is used in the description and the claims, the wording in the plural form also comprises the singular form, provided that, beyond that, the plural is not explicitly required by the reference to a plurality or by a certain quantity.

In particular a group of magnetic coils, which interact in such a way that they generate a magnetic field which moves along with the rotational movement of the rotor, at least in one section, are encompassed by the term coil unit within the scope of the present description. For this purpose, a joint inverter supplies all of the coils of a coil unit with a polyphase current.

FIG. 1 shows parts of an above-mentioned elevator system 50. The elevator system 50 comprises stationary first guide rails 56, along which an elevator car 51 can be guided by means of a backpack bearing. The first guide rails 56 are aligned vertically in a first direction z and make it possible for the elevator car 51 to be moved between different floors. Arrangements of such first guide rails 56, along which the elevator car 51 can be guided by means of a backpack bearing, are arranged parallel to one another in two shafts 52', 52", which run parallel. Elevator cars in the one shaft 52' can move largely independently and unimpeded by elevator cars in the other shaft 52" on the respective first guide rails 56.

The elevator system 50 further comprises stationary second guide rails 57, along which the elevator car 51 can be guided by means of the backpack bearing. The second guide rails 57 are aligned horizontally in a second direction y and make it possible for the elevator car 51 to be moved within one floor. The second guide rails 57 further connect the first guide rails 56 of the two shafts 52', 52" to one another. The second guide rails 57 thus also serve to reposition the elevator car 51 between the two shafts 52', 52", e.g. in order to perform a modern paternoster operation.

The elevator car 51 can be transferred from the first guide rails 56 to the second guide rails 57 and vice versa via third guide rails 58. The third guide rails 58 are rotatable with respect to an axis of rotation A, which is perpendicular to a y-z plane, which is spanned by the first and the second guide rails 56, 57.

All guide rails 56, 57, 58 are at least indirectly fastened to at least one shaft wall of the shaft 52. The shaft wall defines a stationary reference system of the shaft. Alternatively, the term shaft wall also comprises a stationary frame structure of the shaft, which supports the guide rails. The rotatable third guide rails 58 are fastened to a rotating platform 53. The rotating platform 53 is supported by means of a platform pivot bearing, which is not illustrated in FIG. 1.

Such systems are described, in substance, in WO 2015/144781 A1 and also in the German patent applications 10 2016 211 997.4 and 10 2015 218 025.5. In this context, DE 10 2016 205 794.4 describes in detail an arrangement comprising integrated platform pivot bearings and an electric motor for rotating the rotating platform, which can also be used within the scope of the present invention for bearing purposes and as rotational drive for the rotating platform. The elevator system according to FIG. 1 now comprises a drive arrangement 1 according to the invention (FIG. 2) for rotating the rotatable guide rails 58 or for rotating the rotating platform 53, respectively.

Figure 2:
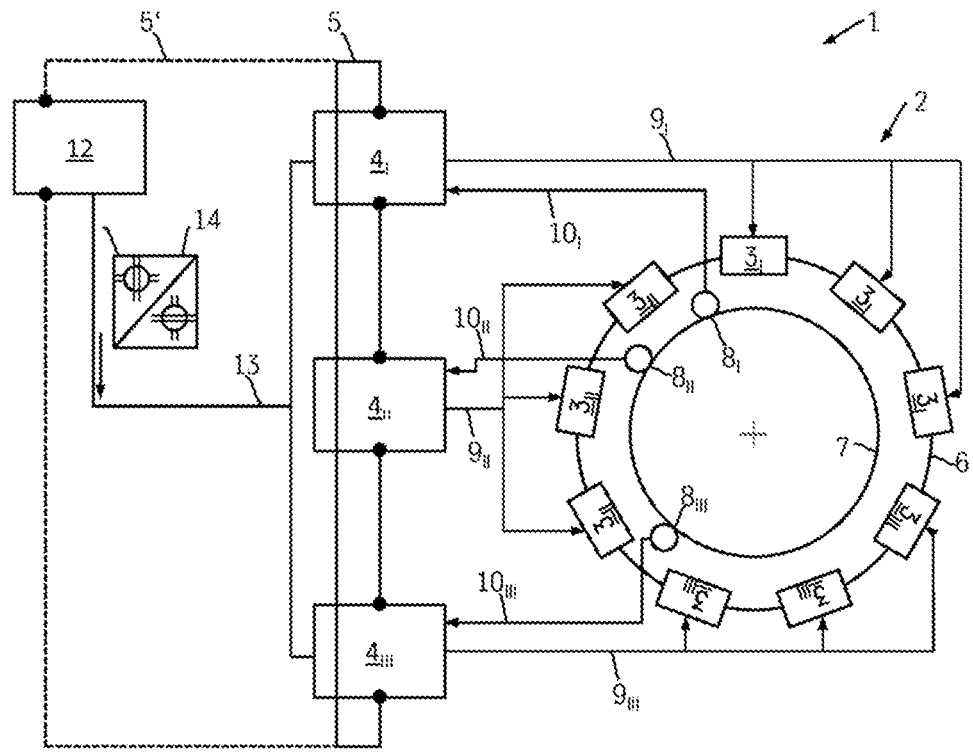
FIG. 2 is a circuit diagram of a drive arrangement.

FIG. 2 now shows the block diagram of a drive arrangement 1 according to the invention. An electric motor 2, here a three-phase motor 2, is the core of the drive arrangement. The electric motor 2 comprises a stator 6 and a rotor 7. In one embodiment, the electric motor can be an external rotor motor, wherein the rotor is arranged radially outside of the stator. The stator 6 comprises a plurality of coil units 3. The coil units are operated with the aid of inverter units 4, which provide electrical power P for the coil units 3 via power transfer connections 9. The rotational position of the electric motor 2 is determined on the basis of position sensors 8 and is provided to the inverter units 4 for control purposes.

A superordinate control unit 12 issues control commands 13 to the inverter units 4. A control command 13 can comprise, for example, an instruction that the rotatable rails 58 are to be arranged horizontally or vertically.

Together, the coil units $3_I$, $3_{II}$, $3_{III}$ and the inverter unit $4_I$, $4_{II}$, $4_{III}$ connected thereto form one of three drive segments I, II, III. In the present example, the three position sensors $8_I$, $8_{II}$, $8_{III}$ are each also assigned to exactly one of the three drive segments I, II, III.

Figure 3:
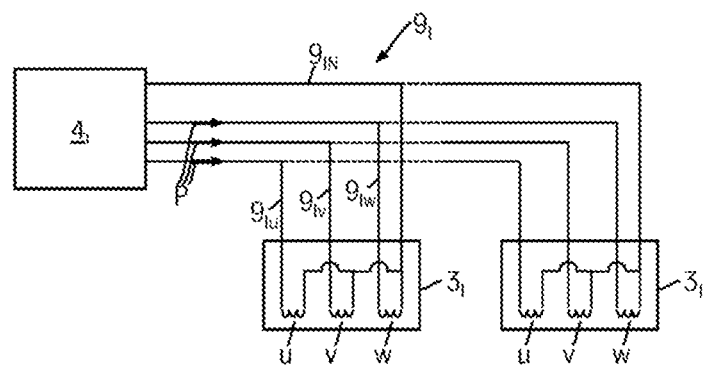
FIG. 3 is a detailed circuit diagram of parts of the drive arrangement.

FIG. 3 shows the the coil unit 31 of the first drive segment I in detail, in an exemplary manner for the remaining coil units 3. Each coil unit 31 comprises three coils u,v,w, which are each assigned to a phase of the polyphase current and which are connected to one another via a star connection. For transferring the drive power P, the power transfer connection $9_I$ comprises a multipolar power line 9 comprising lines $9_{Iu}$, $9_{Iv}$, $9_{Iw}$, for the three phases and also a neutral line $9_{IN}$. It is further suggested that a plurality of such coil units $3_I$ are provided for each drive segment; all in-phase coils of a joint drive segment are then interconnected parallel to one another.

Figure 4:
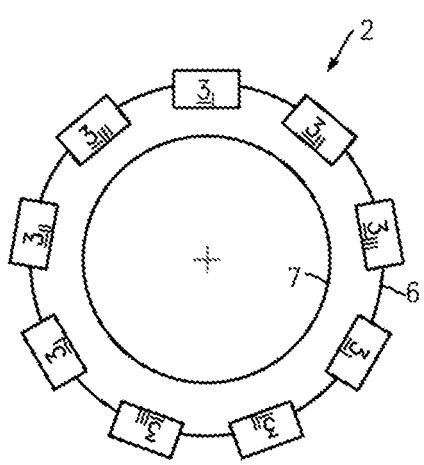
FIG. 4 is a circuit diagram of an alternative electric motor for the drive arrangement according to FIG. 2.

FIG. 4 shows the electric motor in a modified form. In the case of the stator and 6, the coil units $3_I$, $3_{II}$, $3_{III}$ of the individual drive segments I, II, III are arranged so as to alternate in the circumferential direction. This has the advantage, in the event of a failure of one or a plurality of drive segments I, II, III, that the torques, which is generated by the coils, acts evenly on the rotor 7 across the circumference. One-sided loads on the mechanical components of the electric motor are thus avoided. For the sake of clarity, the lines 9 are not illustrated in this figure; it goes without saying, however, that the coil units are still connected to the respective assigned inverter unit of the same drive segment. The circuit diagram according to FIGS. 2 and 3 is applicable in this respect.

Figure 5:
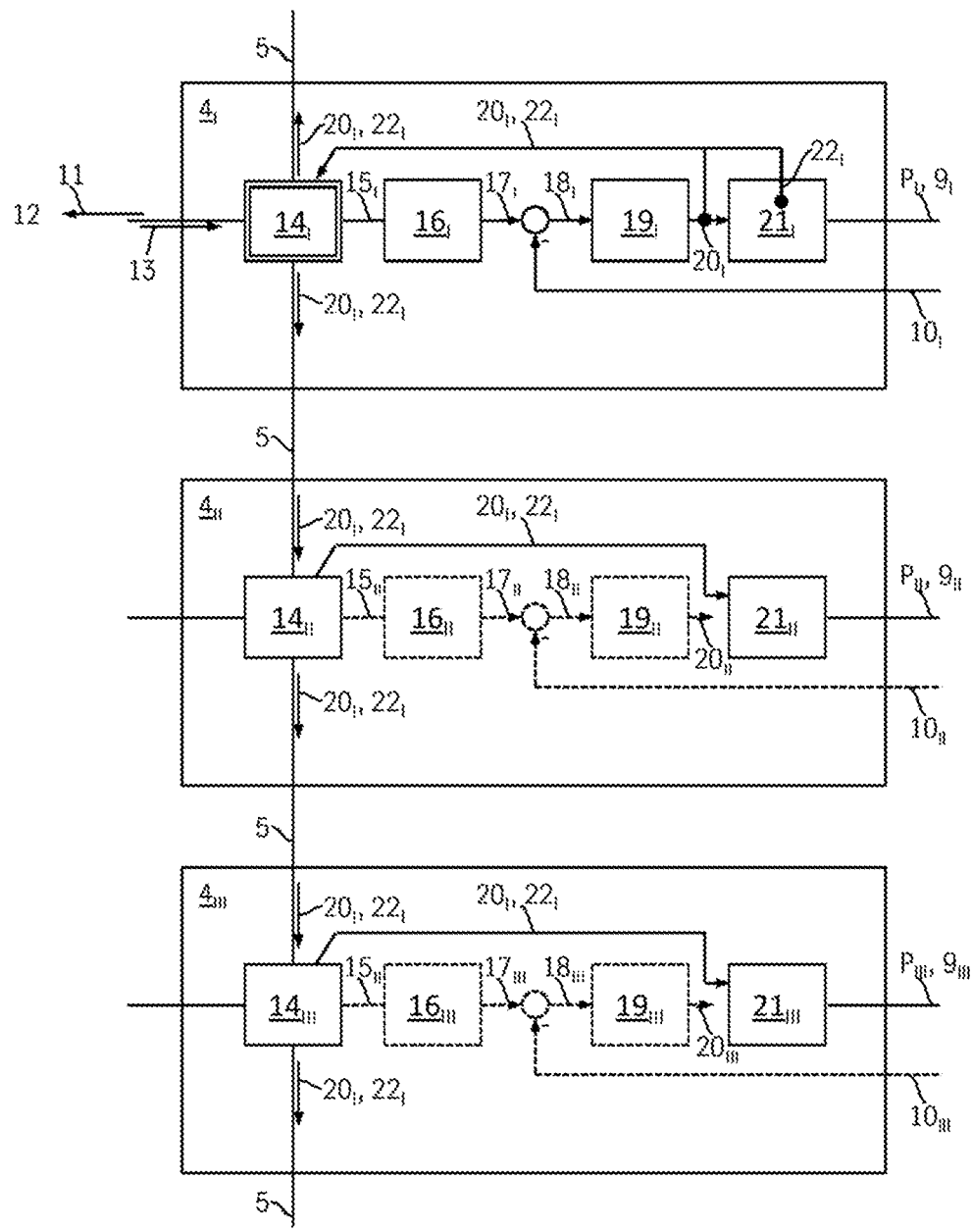
FIG. 5 is a detailed circuit diagram of the inverter units of the drive arrangement in a first operating state.
Figure 6:
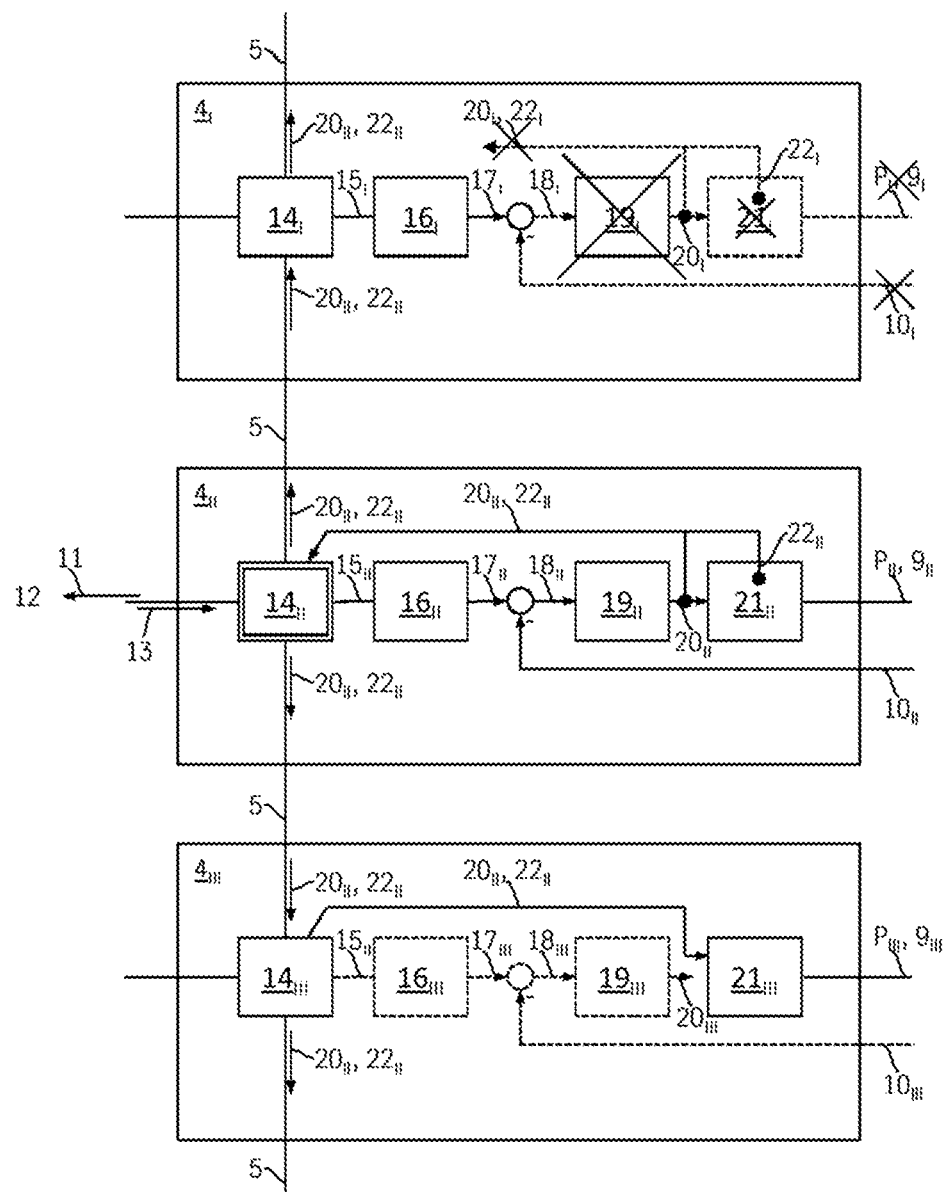
FIG. 6 is the circuit diagram according to FIG. 5 in a second operating state.

The inverter units 4 of the drive arrangement 1 according to FIG. 2 are illustrated in detail in FIGS. 5 and 6. All inverter units are embodied identically and are programmed identically. The inverter units can thus be exchanged easily or the number of the inverter units can readily be changed, respectively. The inverter units furthermore organize amongst one another as to which of them takes over the communication with the control unit 12. Representative for all inverter units 4, the mode of operation of the inverter units 4 will initially be described on the basis of the first inverter unit $4_I$. The distinctive features of the cooperation of the inverter units amongst one another will then be described further below by using the indexes $_I$, $_{II}$, $_{III}$.

The first inverter unit $4_I$ comprises a first inverter $21_I$. The first inverter $21_I$ generates a first output power $P_I$ of the first inverter unit $4_I$, which is output to the first coil units $3_I$ in the form of a polyphase current via the first line $9_I$. A first guide variable $20_I$, which is provided by a first controller $19_I$, serves as input variable for the first inverter $21_I$. For example a torque value can be used as first guide variable $20_I$. A first control difference $18_I$ of a first guide variable $17_I$ and a first state value $10_I$ serves as first input variable $18_I$ for the first controller $19_I$. In this example, the first state value is an actual value $10_I$ of the position, which is provided by the first position sensor $8_I$. The first guide variable $17_I$ is a first setpoint-actual value 17. It is provided, e.g., that, depending on the deviation of the first actual value $10_I$ of the position from the first setpoint value $17_I$ of the position, the first controller $19_I$ outputs a higher or lower torque value, respectively, in order to compensate the first control difference $18_I$. The first guide variable $17_I$ is provided by a first guide variable generator $16_I$. A first control signal $15_I$, which comprises, for example, the target alignment, which is desired and which is to be set, of the rotatable rail segment, serves as input variable for the first guide variable generator $16_I$. Based on this first control signal $15_I$, the first guide variable generator $16_I$ selects a stored time-guide variable characteristic diagram, on the basis of which the first guide variable $17_I$ is generated and is updated constantly.

The first guide variable generator $16_I$ receives the first control signal $15_I$ from a first communication unit $14_I$. This first communication unit $14_I$ represents the data interface to the outside and can communicate both with the communication units of the other inverter units and with the control unit 12.

In the present exemplary embodiment, a data connection to the other communication units is formed via a bus system 5, here a data ring 5. Each communication unit 14 is thereby configured in such a way that, together with the other communication units, they can specify exactly one of the communication units as master communication unit. This specification can take place, for example, on the basis of a decentralized access method known by networks. In contrast to the network access methods, it is provided here that the master communication unit, which is now specified, initially does not release this master status again. A reallocation occurs only when a redundancy case occurs and the master communication unit has to be specified anew.

It is possible that the bus system 5 simultaneously also represents the connection to the control unit 12. In FIG. 2, this is illustrated by means of the dashed line, which is identified with reference numeral 5'. The inverter units can also use this connection to communicate with one another. Alternatively, the connection 5 between the inverter units 4 can be implemented via a star-shaped or ring-shaped connection with cable connections between the inverter units 4. The controllers then communicate with one another and the control unit communicates with the inverter units via separate lines.

The connection of the communication units 14 via the data ring 5 according to a ring topology is to only be understood in an exemplary manner here. Other types of networking are also conceivable, for example a meshing or a bus connection. It is always provided, however, that the communication units 14 are basically embodied and programmed identically. Each of the communication units 14 is suitable and appropriately configured to take over the role of the master communication unit, if necessary. For the allocation of the master communication unit, the communication units do not require any external support and can thus carry out a reallocation independently.

An allocation with the aid of the central control unit 12, in contrast, would generate a so-called single point of failure, which is undesirable. With the device according to the invention, operation can be maintained even though each individual inverter unit or communication unit, respectively, can fail, as long as at least one communication unit takes over the master function. A communication unit can fulfill the master function as long as the superordinate inverter unit with its components is functioning in a largely error-free manner. Two inverter units can fail in the present case with three inverter units, whereby operation is then still possible with a single drive segment.

The first communication unit $14_I$ of the first inverter unit $4_I$ has now been specified as master communication unit in the present example. The inverter unit, which is superordinate to the respective current master communication unit, currently the first inverter unit $4_I$, will be referred to hereinafter as master inverter unit. The subunits and also state variables of the master inverter unit will also be provided with the prefixed designation "master", here for example the master controller $19_I$ and the master control variable $20_I$.

The master communication unit $14_I$ receives the control command 24 from the control unit 12 and acknowledges receipt by sending a confirmation to the control unit 12. Only the master communication unit $14_I$ sends the confirmation.

In the situation as is illustrated in FIG. 4, the communication unit $14_I$ of the first inverter unit $4_I$ is now specified as master communication unit, which is illustrated by the double frame. Individual master state values of the master inverter unit $4_I$ are now continuously transmitted to the master communication unit $14_I$. This is in particular the master control variable $20_I$ of the master controller $19_I$ and also a master state variable $22_I$ of the master inverter unit $22_I$. The master inverter unit $4_I$ still operates in the manner as has been described further above for the first inverter unit $4_I$.

A state variable 22 of the inverter unit 21 can generally be an internal parameter of the inverter unit 21, which is a function of the incoming control variable on the inverter and/or which has influence on the output power P.

The inverter units, which are not master inverter units, and also the subunits and state variables thereof are provided with the prefixed designation "slave".

The master state values $20_I$, $22_I$ of the master inverter unit transmitted to the master communication unit $14_I$ are transmitted to the other slave communication units $14_{II, III}$. The special feature is now that these master state values $20_I$, $22_I$ are transmitted by the slave communication units $14_{II, III}$ to the respective assigned slave subunit, here the slave controller $19_{II, III}$ and also the slave inverter $21_{II, III}$, and the corresponding slave state values $20_{II, III}$, $22_{II, III}$ are thereby replaced by the master state values $20_I$, $22_I$. In the present case, the master control variable $20_I$ and the master state variable $22_I$ thus replace the corresponding slave control variables $20_{II, III}$ or the master state variables $22_{II, III}$, respectively. It can be seen that the slave controllers $19_{II, III}$ thus idle, i.e. do not exert any actual influence on the control of the electric motor 2. In the case of the slave inverter units $4_{II, III}$ the corresponding elements, which currently do not make any contribution to the control of the electric motor 2, are thus illustrated by means of dashes.

The redundancy case is illustrated in FIG. 6. Due to a malfunction, the first inverter unit $4_I$ with the master communication unit $14_I$ thereof is no longer able to fulfill the master function. The malfunction can be based on a defect of the corresponding position sensor $8_I$, of the controller $19_I$, of the inverter unit $21_I$, or of a connecting line. This malfunction is identified by the first communication unit $14_I$. Until this point in time, the first inverter unit $4_I$ is still the master inverter unit. The master communication unit $14_I$ now outputs a signal to the remaining communication units $14_{II, III}$, by means of which the latter are jointly requested to reallocate the master function. This signal includes the information that the first communication unit $14_I$ is no longer available as master communication unit.

The current slave communication units now independently determine a new master communication unit from their midst. According to the present illustration, the second communication unit $14_{II}$ is specified as master communication unit; the third communication unit $14_{III}$ is still a slave communication unit. The first inverter unit $4_I$ and thus the entire first drive segment I is now inoperative. The entire drive power is now provided via the remaining second and third drive segment II, III. The inverters and the coil units are dimensioned such that two drive segments are sufficient for maintaining the operation of the drive arrangement without performance loss. The service department can be notified in this phase and the defective drive segment can be repaired in a phase of low utilization, e.g. at night. In the unlikely case of a further failure of one of the remaining drive segments II, III, one operational drive segment still remains. The latter ensures at least an emergency operation with reduced performance. This means in particular that the duration of the rotation of the rotatable rail segments is extended with respect to normal operation. The operation of the elevator system can be maintained here, albeit with reduced capacity. It is already helpful, however, that it can be ensured by the emergency operation that the rotatable rail segment is set to vertical. The rotatable rail segment can thus permanently fulfill the function of a vertical rail segment, so that a vertical travel operation remains permanently ensured. Until the repair, the repositioning of the cars between two shafts then has to take place on different floors.

In the exemplary embodiment, the first control variable and the first state variable of the inverter, which are transmitted by the master inverter unit to the respective other slave inverter units and which are the basis for the operation of the other slave inverter units, is shown only in an exemplary manner as possible state value. The actual value or the control difference 18 provided by the sensor 10 can also be transferred as controller variable which is to be transferred. A concrete amperage value, for example, with which the inverter 21 currently operates, can be transmitted as state variable 22 of the inverter 21.

Figure 7:
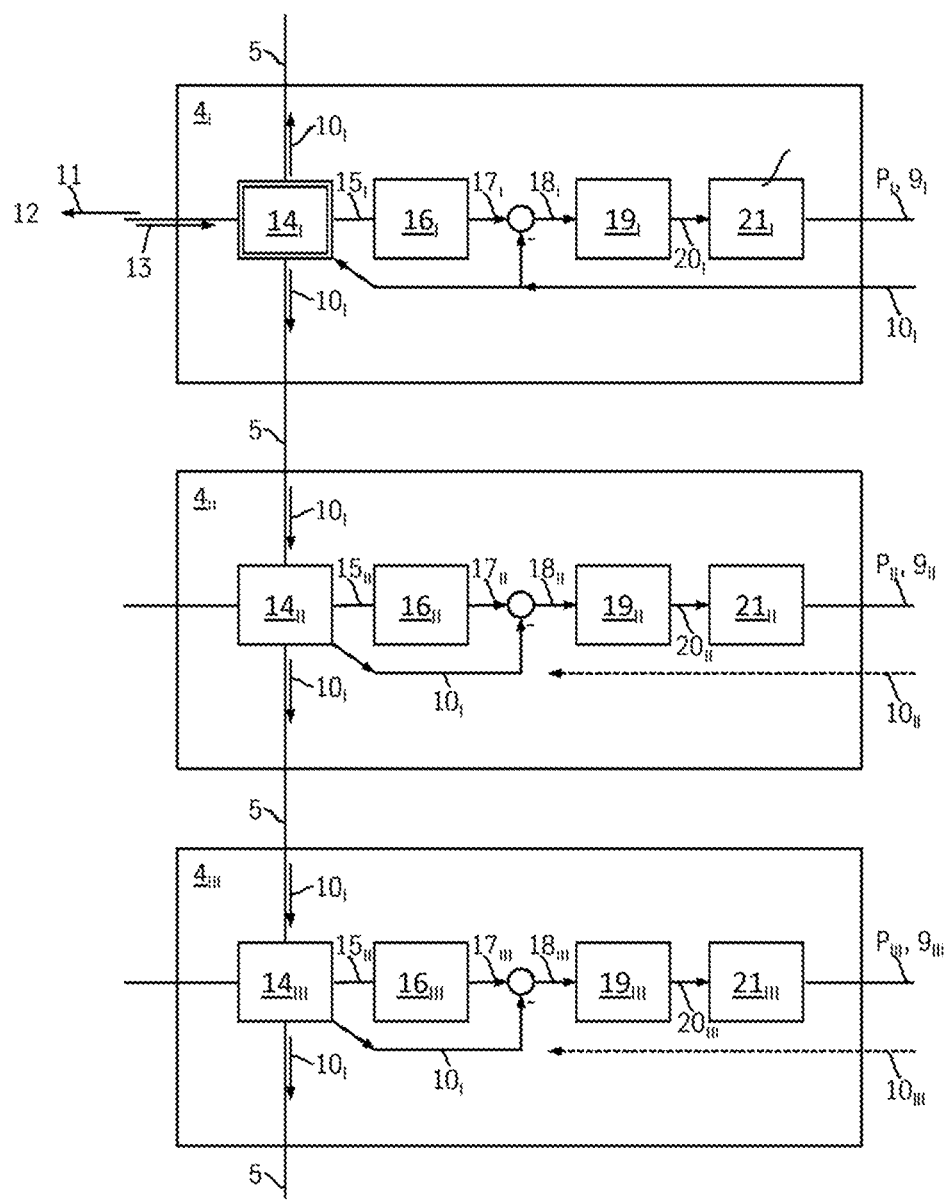
FIG. 7 is a detailed circuit diagram of the inverter units of an alternative drive arrangement in a first operating state.

Alternatively, it is possible (FIG. 7) that the sensor value $10_I$ of the master inverter unit $4_I$ is distributed via the master communication unit $4_I$ to the slave inverter units; together, the slave controllers $19_{II}$, $19_{III}$ then use the same master sensor value $10_I$. The respective guide variables 17 can either be generated via the respective own guide variable generator of the respective inverter unit (as illustrated in FIG. 7), or can also be transmitted by the master inverter unit via the bus connection 5 (according to FIG. 5). If the sensor assigned to the master sensor unit fails, a reallocation of the master inverter unit is prompted according to the other embodiments.

LIST OF REFERENCE NUMERALS 1 drive arrangement
2 electric motor
3 coil arrangement
4 inverter unit
5 data ring
6 stator
7 rotor 8 position sensor
9 power transfer connection
10 position sensor value
11 confirmation to control unit
12 control unit
13 control command
14 communication unit
15 control signal
16 guide variable generator
17 guide variable
18 control difference
19 controller
20 control variable (state value of the inverter unit)
21 inverter
22 state variable of the inverter (state value of the inverter unit)
50 elevator system
51 elevator car
52 shaft
53 rotating platform
56 stationary first guide rail
57 second stationary guide rail
58 third rotatable guide rail
I first drive segment
II second drive segment
III third drive segment
P electrical power

What is claimed is:

1. A drive arrangement for moving a movable segment of a guide rail in an elevator system, comprising:
   a movable rail segment configured to be rotatably moved during operation of the elevator system from alignment with a first fixed vertical rail segment and into alignment with a second fixed non-vertical rail segment, so as to temporarily interrupt a vertical travel path of an elevator car in an elevator shaft depending on a respective position or rotational position of the movable rail segment; and
   an electric motor configured to rotatably drive said movable rail segment from alignment with the first fixed vertical rail segment and into alignment with the second fixed non-vertical rail segment, said electric motor having:
      a rotor, and
      a stator that defines at least two redundant drive segments that are each configured to independently generate a separate rotational drive force that acts on said rotor to cause rotation of said movable rail segment in the same rotational direction, wherein each of the said at least two drive segments of said stator comprises:
         at least one coil arrangement configured to generate a driving force applied to said rotor to rotatably move said movable rail segment, and
         an inverter unit having a communication unit configured to receive a control command relating to a target position or target alignment of said movable rail segment, said inverter unit being configured to provide electrical power to said at least one coil arrangement based on said control command, wherein said respective communication units in each of said inverter units of said at least two drive segments are configured to designate, amongst themselves, one of said communication units to serve as a master communication unit for management of control commands, and the remaining communication units to serve as slave communication units.

2. The drive arrangement of claim 1, wherein the electric motor is configured to rotate the movable rail segment about an angle of rotation of less than 360°.

3. The drive arrangement of claim 1, wherein the communication units are configured to designate the master communication unit free of interconnection of a central control unit.

4. The drive arrangement of claim 1, further comprising a control unit configured to send a control command to the respective inverter units, wherein the communication units are configured such that only the master communication unit is authorized to issue to the control unit either a receipt or an execution confirmation relating to the control command.

5. The drive arrangement of claim 1, wherein the master communication unit is configured to receive a state value of the associated inverter unit of the master communication unit, and to send the state value to the slave communication units.

6. The drive arrangement of claim 5, wherein the sending of the state value to the slave communication units takes place free of interconnection of a central control unit.

7. The drive arrangement of claim 5, wherein the inverter unit that corresponds to the master communication unit, comprises a controller, and the state value to be sent represents a controller variable of the controller.

8. The drive arrangement of claim 5, wherein the inverter units each comprise an inverter, and the state value to be sent represents a state variable of a respective inverter.

9. The drive arrangement of claim 5, wherein the inverter unit, which is superordinate to a slave communication unit, is configured to use the state value provided by the master communication unit for provision of the electrical power, even though the inverter unit is embodied to generate a corresponding state value on its own.

10. The drive arrangement of claim 1, wherein the communication units are configured such that the master communication unit prompts a reallocation of the master communication unit, as soon as the master communication unit determines an error within the corresponding drive segment, wherein the current master communication unit is excluded from a reallocation.

* * * * *